Oct. 10, 1967  S. R. FULTON  3,346,434

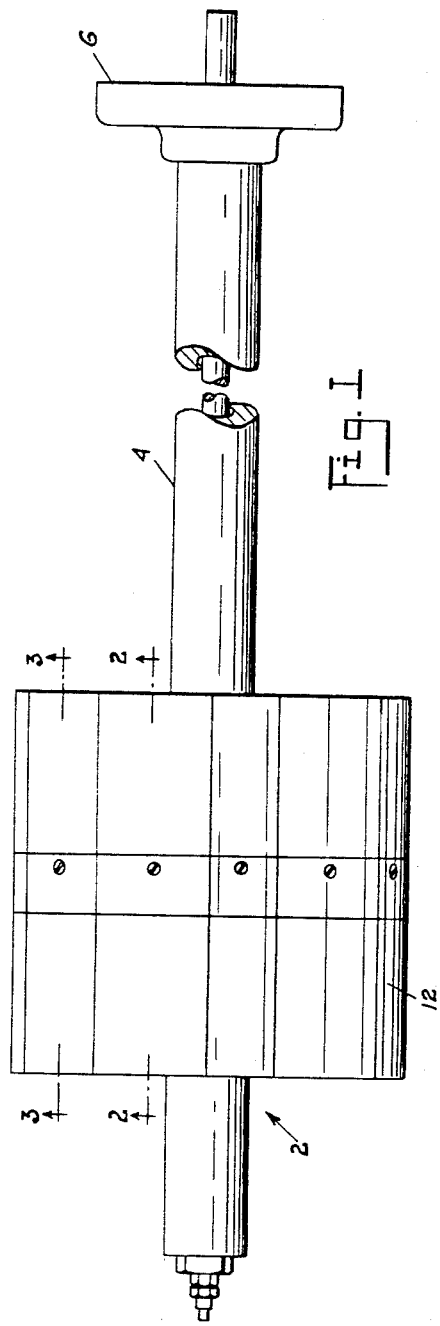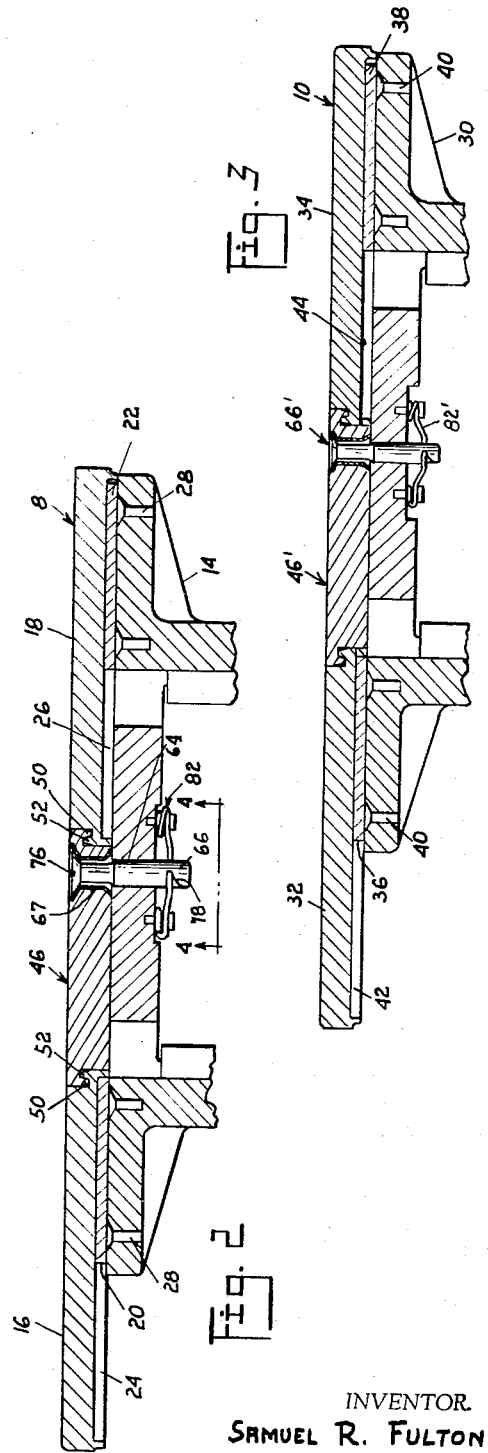

TIRE BUILDING DRUM

Filed June 9, 1964  2 Sheets-Sheet 2

INVENTOR.
SAMUEL R. FULTON

BY Teare, Fetzer & Teare
ATTORNEYS

United States Patent Office 3,346,434
Patented Oct. 10, 1967

3,346,434
TIRE BUILDING DRUM
Samuel R. Fulton, Cuyahoga Falls, Ohio, assignor to
The Akron Standard Mold Company, Akron, Ohio, a
corporation of Ohio
Filed June 9, 1964, Ser. No. 373,669
12 Claims. (Cl. 156—415)

This invention relates to a tire building drum and more particularly to an improved arrangement for adjusting the width-wide dimension of the tire building surface of the drum.

Conventionally, tire casings are produced by assembly of the component parts therefor, such as the carcass plies, bead rings, tread and side wall portions, in the form of a flat band on a continuous surface presented by the rotatable tire building drum. The drum is generally comprised of a plurality of radially disposed segmental drum segments which provide the continuous tire building surface and which are generally arranged for collapsing movement so as to reduce the drum diameter and thereby to permit removal of the tire band for subsequent shaping and vulcanizing operations.

Heretofore, various arrangements have been known to permit adjustment and/or to vary the width of the tire building surface so as to accommodate tires of varying diameter. In some instances, the adjustment between the drum segments has been sought to be accomplished by interchangeable spacer elements removably secured to the drum by various nut and bolt and/or screw-type devices. It has been found, however, that such devices are not only costly from a production standpoint, but are cumbersome and inefficient from an installation and operational standpoint, particularly when required to be installed within minimum space requirements or in inaccessible or blind areas, such as those presented by a tire building drum.

Furthermore, in addition to facile and rapid interchangeability, the width-wide adjustment between respective of the drum segments must be accomplished by arrangement which permanently secures the components together and which prevents such components from accidentally loosening and/or flying off the drum due to the high rotational speeds incident to the tire building operation.

Accordingly, it is an object of the present invention to provide an improved arrangement for adjusting the widthwise dimension of a tire building drum without recourse to heretofore known types of nut and bolt and/or screw arrangements.

Another object of the present invention is to provide an improved arrangement for axially adjusting a plurality of segmental drum segments defining a continuous tire building surface, which is facilely and readily interchangeable, so that on a single drum, it is possible to produce tires of varying widths without distorting or disturbing the continuity of the tire building surface.

A further object of the present invention is to provide a more simplified and economical arrangement for axially adjusting a plurality of segmental drum segments and which coacts therewith to permanently secure the drum segments in any desired axial adjusted position on the drum.

Further objects and advantages, and other new and useful features in the construction, arrangement and general combination of elements of the arrangement for adjusting the axial width of the tire building surface will be apparent to those skilled in the art as the following description proceeds with reference to the accompanying drawings, for purposes of illustration, but not of limitation, in which like reference characters designate like parts throughout, wherein:

FIG. 1 is a side elevation view, with parts broken away, of a tire building drum made in accordance with the present invention, shown in the expanded position and mounted on a rotary support;

FIG. 2 is an enlarged sectional view taken on the plane indicated by the line 2—2 of FIG. 1, to illustrate the axially adjusted position of a pair of the larger drum segments;

Figure 4:
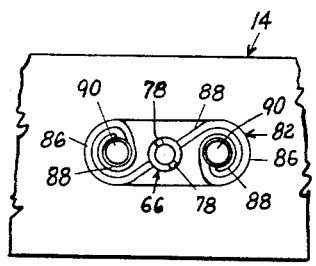
Figure 5:
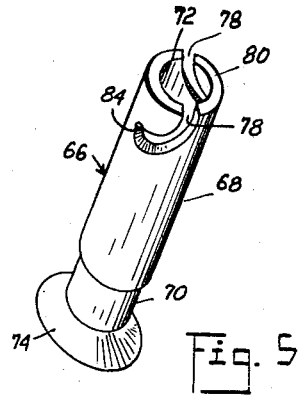
Figure 6:
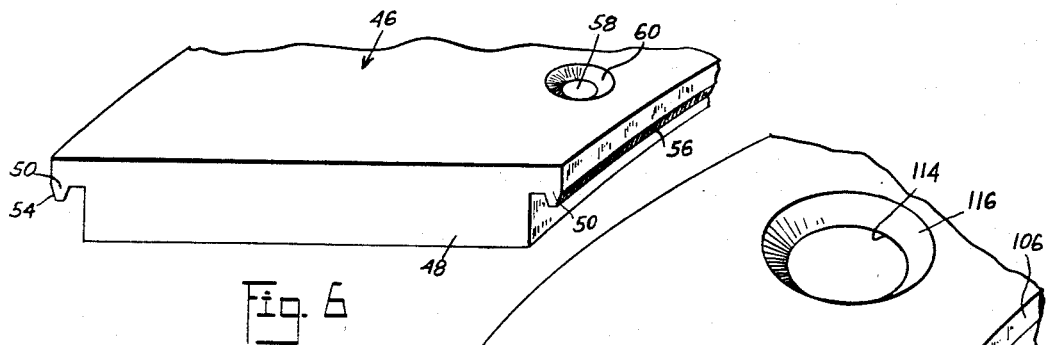
Figure 8:
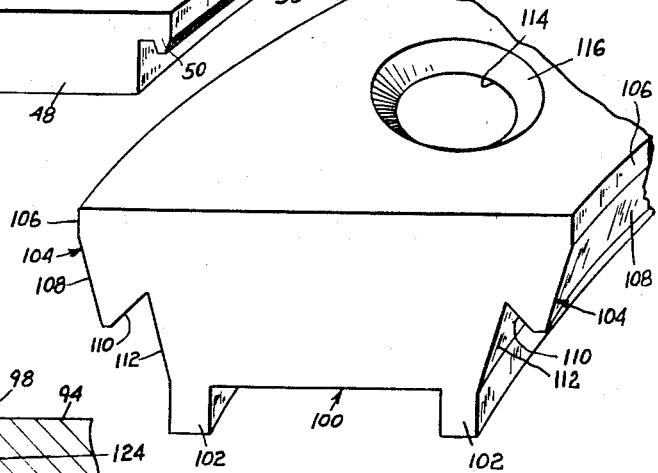
Figure 7:
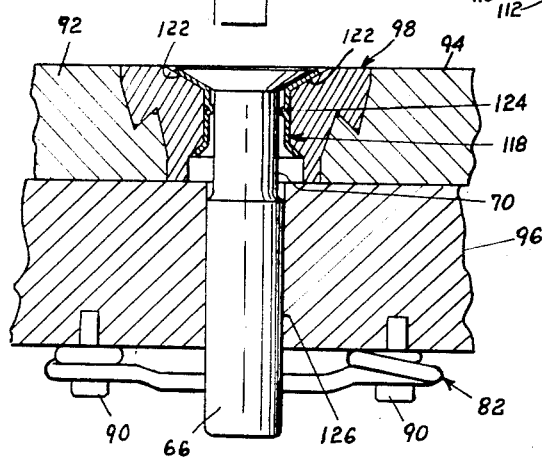

FIGG. 3 is an enlarged section view taken on the plane indicated by the line 3—3 of FIG. 1, to illustrate the axially adjusted position of a pair of the smaller drum segments;

FIG. 4 is an enlarged fragmentary view looking in the general direction indicated by the line 4—4 of FIG. 2, to illustrate the improved resilient clamping arrangement made in accordance with the present invention for securing the drum segments in any axial adjusted position on the drum;

FIG. 5 is a generally enlarged perspective view of one of the elements of the improved resilient clamping arrangement and which is shown removed from the drum assembly;

FIG. 6 is a generally enlarged fragmentary perspective view of one of the segmental spacer members;

FIG. 7 is an enlarged fragmentary section view showing a modification of the improved resilient clamping arrangement made in accordance with the present invention; and FIG. 8 is a generally enlarged fragmentary perspective view and showing the modification of the segmental spacer illustrated in FIG. 7.

The foregoing objects are basically accomplished in accordance with the present invention by providing a plurality of segmental support members mounted for rotation about a central axis. A pair of arcuate wing members are disposed in axially adjusted relation on each of said support members to provide a substantially continuous tire building surface. An arcuate spacer member is adapted to be removably mounted in engaged supported relation on said support member and intermediate the wing members to maintain a substantially continuous tire building surface for selective axially adjusted positions of the wing members. A resilient releasable clamping means is disposed for coaction between the spacer member and the support member, with interlocking means on the spacer member and the respective wing members coacting in engaged relation to lock the wing members in selective axially adjusted positions upon actuation of the clamping means. The axial width of the tire building drum may be readily adjusted without disturbing the continuous tire building surface simply by interchanging different size spacer members upon actuation of the clamping means for different axial adjusted positions of the wing members.

Referring now again to the drawings and in particular to FIG. 1 thereof, there is illustrated a tire building drum, designated generally at 2, of the type which may be expanded and collapsed radially by a conventional type mechanism, as known in the art. The drum is mounted for rotation about a generally longitudinal axis on the outer end of a power quill 4, which quill is a part of a conventional type tire building machine (not shown). The other end of the quill 4 is preferably provided with a split coupling 6 adapted to engage a power actuated motor (not shown) for rotating the quill, as aforesaid.

As further shown in FIGS. 2 and 3 of the drawings, the drum structure preferably includes two sets of drum segments, namely, a set of larger segments 8 and a set of smaller key segments 10 disposed alternatively in relation to the larger segments which coact therewith in the expanded position of the drum to provide a smooth, continuous tire building surface 12 for mounting thereon a tire band.

The set of larger segments 8 (FIG. 2) are preferably mounted for axial movement on a central support or base member 14 attached to the quill 4 and adapted for rotation with the quill, there being one base member 14 disposed radially around the quill for each of the larger segments 8. Each of the larger segments includes an opposed pair of generally arcuate segmental wing members 16 and 18 mounted on the base member 14 for widthwide adjustment by means of key-way elements 20 and 22 mounted on the base member and adapted to be slidably received in corresponding undercut key-way slots 24 and 26 provided on the undersurface of each of the wing members 16 and 18, respectively. The key-way elements 20 and 22 may be attached to the base member 14 by suitable fasteners 28, such as the set screws illustrated. The key and key-way construction may be of any desired cross-sectional configuration having suitable transverse dimensions so as to provide a tight, yet slidable registration between the component parts.

The smaller key-segments 10 (FIG. 3) are mounted for axial movement in an analogous manner to that of the larger segments. Hence, a set of the smaller key segments are preferably mounted for axial movement on a central support member of base member 30 which is attached to and adapted for rotation with the quill 4. Each of the smaller key segments include a pair of opposed generally arcuate segmental wing members 32 and 34 mounted on the base member by means of key-way elements 36 and 38 attached thereto by means of similar type fasteners 40. The key-way elements 32 and 34 are similarly adapted for axial sliding movement within undercut key-way slots 42 and 44 provided on the undersurface of the wing-members 32 and 34, respectively. With this arrangement, the drum segments 8 and 10 can be radially expanded so that the respective pairs of opposed wing members 16, 18 and 32, 34 coact to provide a smooth, continuous tire building surface, and thereafter can be radially collapsed by a conventional type mechanism (not shown) in the manner and for the purposes as hereinbefore described.

In accordance with the present invention, the wing members 16 and 18 of the larger key segments 8 are spaced axially from one another by means of a spacer element 46 (FIG. 6) which is preferably also of a generally arcuate, segmental construction. The spacer element in the embodiment shown is generally of a T-shaped configuration and includes a central body 48 having outwardly extending, generally L-shaped marginal flange portions 50 which are adapted to be disposed in overlapping relationship with complementary, generally L-shaped marginal flange portions 52 provided on the inner ends of the respective wing members 16 and 18. The flange portions 50 and 52 are preferably provided with complementary beveled edges 54 and 56 to facilitate interlocking coaction between the spacer elements and the wing members during installation thereof.

To provide rapid, yet precise interchangeability, each spacer element 46 is preferably provided with an eccentrically disposed opening 58 having a beveled edge portion 60 which is adapted to seat therein a complementary shaped, generally cylindrical sleeve or insert 67 comprised of a wear-resistant material, such as steel or the like. In the assembled position of the spacer element 46, the opening 58 therein is adapted for axial registration with an opening 64 provided in the base member 14 which together define a passageway for a stud 66 to be inserted therein.

The stud 66 proper is of an elongated, tubular construction which includes a generally cylindrical lower barrel portion 68 having a transverse dimension to be tightly, yet slidably inserted into the opening 64 provided in the base member 14, and a generally cylindrical upper portion 70 of reduced diameter having a transverse dimension which is less than the transverse dimension of the insert 67 disposed in the opening 58 of the spacer element 46. The lower barrel portion 68 is open at one end, as at 72, while the reduced portion 70 is provided at its upper end with a generally conical head 74 having a transverse slot 76 therein to receive a suitable tool, such as a screwdriver, to apply turning pressure to the stud.

As best shown in FIG. 5, the stud 66 is provided adjacent its open barreled end with a pair of oppositely disposed generally helical slots 78. The slots 78 open in generally radial alignment at one end onto the marginal end surface 80 of the barrel portion 68 and are adapted to receive therethrough a resilient tightening means in the form of a spring, designated generally at 82. The slots 78 are provided adjacent their other ends with radially aligned, generally closed end portions 84 which serve as an abutment to limit further turning of the stud about its rotational axis upon engagement with the spring 82.

In FIG. 4, the spring 82 is shown as being generally S-shaped, in plan, configuration defined by a pair of oppositely disposed generally semi-circular outer loops 86 which are joined together by a generally diagonally extending linear portion 88. The respective outer loops 86 are bent angularly inwardly adjacent their free ends to define another pair of substantially closed inner loops 88. The inner loops 88 are disposed in a generally concentric relationship relative to the outer loops 86 and are adapted to receive therethrough suitable fasteners 90, such as the set screws illustrated, to permanently secure the spring 82 to the base member 14. The spring is preferably made from a resilient metal material, such as steel or cold rolled wire or rod, having high spring-like characteristics.

As shown in FIG. 3, the arrangement for axial adjustments of the wing members 32 and 34 of the smaller key segments 10 is generally identical with that for adjustment for the larger segments 8, except for modification incident to the dimensional size of the stud 66' and coacting spring 82' for resiliently locking the spacer element 46' to the base member 30. In all other respects the construction, arrangement and general operation of the smaller key segments is substantially the same as that for the larger segments.

In FIGS. 7 and 8 there is illustrated a modification of the arrangement for axially adjusting a pair of wing members 92 and 94 mounted on a base member 96. The spacer element 98 is also of a generally arcuate, segmental construction, except in this form, the spacer is of an irregular, generally T-shaped, in cross-section, configuration which includes and is defined by a main body 100, a pair of oppositely disposed substantially parallel legs 102 depending from and extending generally longitudinally relative to said body, and a pair of oppositely disposed marginal flanges 104 projecting outwardly from and also extending generally longitudinally relative to the body 100. The respective marginal flanges 104 are preferably also of an irregular, but generally triangular shape, in cross-section, configuration, each of which is defined by a generally vertical side portion 106, an angularly inwardly extending generally planar side portion 108 and an angularly upwardly extending generally planar undercut portion 110. Each of the marginal flanges 104 in the embodiment shown is preferably connected to one of the depending legs 102 by downwardly and angularly inwardly extending generally planar side wall portions 112 which extends in the same general direction as the side wall portion 108 of the respective flanges, thereby to provide the cross-sectional configuration illustrated.

In this embodiment, the spacer element is provided with a centrally disposed stud-receiving opening 114, interiorly beveled, as at 116, rather than being disposed eccentrically as hereinbefore described in connection with FIGS. 1 to 6. The opening 114 is similarly adapted to seat therein a wear-resistant insert, designated generally at 118, which in this form, includes a peripherally-continuous shell 120 flared angularly outwardly at the opposed ends, as at 122, but which further includes a circumferentially-continuous rib 124 disposed on the interior of the shell. The transverse dimension presented by the rib 124 is preferably slightly greater than the transverse dimension or diameter of the reduced portion 70 of one of the aforementioned types of studs 66. By such arrangement, the insert engageably coacts with the stud 66 to effectively retain the same in axial registration when inserted through a concentrically disposed opening 126 provided in the base member 96. A resilient spring 82 of the aforementioned type is permanently secured to the base member 96 via suitable fasteners 90 in the manner and for the purposes as hereinbefore described.

In operation and with reference to the assembly of the larger drum segments 8, when it is required to vary the width of the tire building surface, one of the studs 66 is simply turned about its rotational axis until it is automatically backed off from coacting engagement with the spring 82 to release the clamping action of the stud head 74 within the opening 58 provided in the spacer element 46. With the spacer element 46 loosened, the wing members 16 and 18 may then be adjusted axially to accommodate a new spacer element of the desired width. Once the new spacer element is selected, the wing members 16 and 18 may then be repositioned with their marginal flange portions 50 disposed in interlocking and overlapping relationship with the complementary flange portions 52 provided on the inner ends of the respective wing members. The stud 66 may then be inserted through the aligned openings 58 and 64 in the spacer 46 and base member 14, respectively, wherein the helical slots 78 will be brought into alignment with the spring 82. By then rotating the stud 66, the helical slots 78 are threadably turned down over the spring 82 which coacts therewith to draw the head 74 of the stud down into clamping engagement with the beveled opening 58 in the spacer element 46. Rotational movement of the stud in relation to the spring 82 is continued until further movement thereof is arrested by an abutment of the spring 82 against the closed end portions 84 of the respective slots 78, whereupon the wing members 16 and 18 will be permanently locked in tight abutting engagement against the base member 14.

Accordingly, it can be seen that with this improved arrangement, the tire building surface may be readily and easily adapted for any desired width without disturbing or distorting the tire building surface. The arrangement is highly economical, simple, yet precise due to the interlocking and overlapping registration between the spacer elements and the associated wing members together with the resilient fastener construction which provides an automatic self-clamping coaction by simple manipulation of the stud. It can be seen that such resilient fastener construction provides a highly satisfactory arrangement for locking the wing members in any axially adjusted position, particularly in inaccessible or confined work areas as presented by a tire building apparatus and/or operation.

The terms and expressions which have been used are terms of description and not of limitation, and there is no intention in the use of such terms and expressions of excluding any equivalents of any of the features described or shown, or portions thereof, but it is recognized that various modifications are possible within the scope of the invention claimed.

I claim:

1. In a tire building drum comprising, an arcuate segment support member adapted to be mounted for rotation about a central axis, a pair of arcuate wing members disposed in axially adjusted relation on said support member to provide a substantially continuous tire building surface, an arcuate spacer member adapted to be removably mounted in engaged relation on said support member and intermediate said wing members to maintain a substantially continuous tire building surface for selective axially adjusted positions of said wing members, and resilient releasable clamping means adapted to coact between said support member and said spacer member to secure said wing members in selected axially adjusted positions on said support member.

2. In a tire building drum in accordance with claim 1, wherein said resilient releasable clamping means includes a headed stud member having slotted means adjacent one end thereof and adapted to be inserted through aligned openings in said spacer and support members, a resilient spring-like element carried by said support member adapted to engageably coact with said slotted means upon actuation of said stud to draw the stud head toward said support member and thereby clamp said spacer member to said support member.

3. A tire building drum comprising in combination, an arcuate segment support member adapted to be mounted for rotation about a central axis, a pair of arcuate wing members having undercut slotted portions therein mounted for axial adjustable movement on said support member to provide a substantially continuous tire building surface, guide means carried by said support member coacting with said slotted portions to retain said wing members in selective axially adjusted position on said support member, an arcuate spacer member removably mounted in engaged supported relation on said support member and intermediate said wing members to maintain a substantially continuous tire building surface for selective axially adjusted positions of said wing members, resilient releasable clamping means coacting between said spacer member and said support member, and interlocking means on said spacer member and said wing members coacting in engaged relation to lock said wing members in selected axially adjusted position upon actuation of said clamping means.

4. A tire building drum in accordance with claim 3, wherein said guide means includes a key way member attached to said support member and disposed in coacting guiding engagement within the slotted portions of each of said wing members.

5. A tire building drum in accordance with claim 3, wherein said resilient releasable clamping means includes a headed stud member having slotted means adjacent one end thereof removably disposed through aligned openings provided in said spacer member and said support member, a resilient spring element carried by said support member to engageably coact with said slotted means upon rotation of said stud to draw the stud head toward the support member and thereby clamp the spacer member and wing members to said support member.

6. A tire building drum in accordance with claim 5, wherein the opening in said spacer member is disposed to provide eccentric width-wise axial adjustment of said wing members.

7. A tire building drum in accordance with claim 3, wherein said interlocking means includes a pair of laterally disposed marginal flanges projecting from each side of said spacer member and disposed in overlapping relationship with complementary flanges on the inner edges of said wing members, whereby said flanges coact to provide a substantially continuous tire building surface.

8. A tire building drum in accordance with claim 7, wherein said spacer member is generally of a T-shaped, in cross-section, configuration and wherein said flanges are generally L-shaped, in cross-section, including beveled edge portions to facilitate interlocking engagement with the complementary flanges on said wing members.

9. A tire building drum in accordance with claim 7, wherein said spacer member is of an irregular generally T-shaped, in cross-section, configuration and wherein said flanges are generally triangular, in cross-section, said spacer member including a pair of oppositely disposed substantially parallel depending legs extending generally longitudinally thereof and disposed in engaged supported relation on said support member.

10. A tire building drum comprising in combination, an arcuate segmental support member having an opening therein mounted for rotation about a central axis, a pair of arcuate wing members having undercut slotted portions therein mounted for axially adjustable movement on said support member, a plurality of guide members carried by said support member coacting in engaged guiding relation within said slotted portions to retain said wing members in selective axially adjusted positions on said support member, an arcuate spacer member having an opening therein removably mounted on said support member and coacting in engaged relation intermediate said wing members to maintain a substantially continuous tire building surface for selective axially adjusted positions of said wing members, and resilient releasable clamping means coacting between said spacer member and said support member to secure said wing members in selective axial adjusted positions on said support member, said clamping means including a headed stud member having slotted means adjacent one end thereof and disposed for rotation through the openings in said spacer and support members, a resilient spring element carried by said support member and located to be engageably received by said slotted means upon rotational movement of said stud to draw the stud head toward the support member and thereby resiliently clamp said spacer and wing members to said support member.

11. A tire building drum in accordance with claim 10, including interlocking means on said spacer member and said wing members, said interlocking means including a pair of laterally extending marginal flanges projecting from each side of said spacer member and disposed in coacting overlapping relationship with complementary flanges projecting from the inner marginal edges of said wing members, whereby the clamping force applied to said spacer member is transmitted to said flanges for interlocking said wing members to said spacer member against said support member upon rotation of said stud.

12. A collapsible tire building drum comprising in combination, a plurality of arcuate segment support members adapted to be assembled in end-to-end relation for rotation as a unit about a central axis, a pair of arcuate wing members having openings therein mounted for axial adjustment movement on each of said support members, an arcuate spacer member having an opening therein removably mounted on each of said support members and coacting in engaged relation intermediate each pair of wing members to maintain a substantially continuous tire building surface for selective axially adjusted positions of said wing members, and resilient releasable clamping means coacting between said spacer member and each of said support members to secure said wing members in selective axial positions on said support members, said clamping means including a headed stud member having slotted means adjacent one end thereof and disposed for rotation through the openings in the respective spacer and support member, a resilient spring element carried by each of said support members and disposed to be engageably received by said slotted means upon rotation of said stud to draw the stud head toward the support member and thereby resiliently clamp said spacer and wing members to said support members.

References Cited
UNITED STATES PATENTS

| | | | |
|---|---|---|---|
| 1,896,214 | 2/1933 | Bostwick | 156—415 |
| 2,030,749 | 2/1936 | Heston | 156—415 |
| 2,614,057 | 10/1952 | Ericson et al. | 156—415 X |
| 2,980,160 | 4/1961 | Deibel | 156—415 |
| 3,178,331 | 4/1965 | Bishop et al. | 156—415 |
| 3,207,648 | 9/1965 | Shilts | 156—415 |
| 3,237,199 | 2/1966 | Brey | 156—415 |

EARL M. BERGERT, *Primary Examiner.*

C. B. COSBY, *Assistant Examiner.*